(12) United States Patent
Bellamy et al.

(10) Patent No.: US 7,767,612 B2
(45) Date of Patent: Aug. 3, 2010

(54) ESTERIFICATION CATALYST, POLYESTER PROCESS AND POLYESTER ARTICLE

(75) Inventors: Andrew Martin Bellamy, Stokesley (GB); Charles Mark Lindall, Stockton-on-Tees (GB); Calum Harry McIntosh, Stockton-on-Tees (GB); Martin Graham Partridge, Stockton-on-Tees (GB); John Armstrong Young, Midlothian, VA (US); Steven Charles Davies, Apex, NC (US)

(73) Assignees: Johnson Matthey PLC, London (GB); Performance Fibers, Inc., Richmond, VA (US)

( * ) Notice: Subject to any disclaimer, the term of this patent is extended or adjusted under 35 U.S.C. 154(b) by 541 days.

(21) Appl. No.: 10/432,510

(22) PCT Filed: Nov. 21, 2001

(86) PCT No.: PCT/US01/43256

§ 371 (c)(1),
(2), (4) Date: Nov. 24, 2003

(87) PCT Pub. No.: WO02/42537

PCT Pub. Date: May 30, 2002

(65) Prior Publication Data

US 2004/0077486 A1 Apr. 22, 2004

Related U.S. Application Data

(60) Provisional application No. 60/252,079, filed on Nov. 21, 2000.

(51) Int. Cl.
*B01J 31/00* (2006.01)
*B01J 37/00* (2006.01)
*C08F 4/02* (2006.01)
*C08F 4/60* (2006.01)

(52) U.S. Cl. .............. 502/103; 502/150; 502/162; 502/164; 502/167; 502/171

(58) Field of Classification Search .............. 502/102, 502/103, 117, 123, 124, 125, 129, 154, 170, 502/171, 150, 162, 164, 167; 528/279, 283, 528/285, 300, 302, 308, 308.6
See application file for complete search history.

(56) References Cited

U.S. PATENT DOCUMENTS

| | | | |
|---|---|---|---|
| 3,444,139 A | 5/1969 | Jeurissen et al. | |
| 3,644,291 A | 2/1972 | Price et al. | |
| 4,452,969 A | 6/1984 | McCready | |
| 5,527,622 A * | 6/1996 | Kato et al. | 428/481 |
| 5,561,183 A | 10/1996 | Kwon et al. | |
| 5,591,800 A | 1/1997 | Takekoshi et al. | |
| 5,703,139 A * | 12/1997 | Kim et al. | 522/42 |
| 5,866,710 A * | 2/1999 | Ridland et al. | 560/98 |
| 5,872,204 A | 2/1999 | Kuo et al. | |
| 6,075,115 A * | 6/2000 | Putzig et al. | 528/279 |
| 6,114,458 A | 9/2000 | Hawker et al. | |
| 6,133,404 A * | 10/2000 | Kang et al. | 528/279 |
| 6,437,088 B1 * | 8/2002 | Duan | 528/279 |

FOREIGN PATENT DOCUMENTS

| WO | WO 00/71251 | 11/2000 |
|---|---|---|
| WO | WO00/71252 | 11/2000 |

* cited by examiner

*Primary Examiner*—Jerry Lorengo
*Assistant Examiner*—James E McDonough
(74) *Attorney, Agent, or Firm*—Jones Day

(57) ABSTRACT

A catalyst composition for producing polyesters comprises: a) an organometallic compound obtained by reacting an orthoester or condensed orthoester of titanium, zirconium or aluminum, an alcohol containing at least two hydroxyl groups, a 2-hydroxy carboxylic acid and a base; and b) at least one compound comprising germanium, antimony or tin. Polyesters obtained by esterification reaction in the presence of the catalyst compositions according to the present invention exhibit improved melt properties and are particularly suitable for production of textile and commercial fibers, films and rigid packaging.

56 Claims, 5 Drawing Sheets

ESTERIFICATION CATALYST, POLYESTER PROCESS AND POLYESTER ARTICLE

CROSS REFERENCE TO RELATED APPLICATIONS

This application is the National Phase of International Application No. PCT/US01/43256, filed Nov. 21, 2001, and which further claims priority from U.S. Provisional Application No. 60/252,079, filed Nov. 21, 2000. These applications, in their entirety, are incorporated herein by reference.

BACKGROUND OF THE INVENTION

The invention concerns a polyester fibre composition and a process for its manufacture which utilises a novel organotitanium or organozirconium catalyst Antimony (Sb), tetraisopropyl titanate, and triethanolamine titanate are known catalysts for esterification processes. Also, organotitanium compounds and, in particular, titanium alkoxides or orthoesters are known as catalysts for esterification processes. Many organotitanium compounds which are effective catalysts in the manufacture of polyesters such as polyethylene terephthalate are known to produce unacceptable yellowing in the final polymer. U.S. Pat. No. 5,866,710 describes an esterification process using a catalyst system which comprises the reaction product of an orthoester or condensed orthoester of titanium or zirconium, an alcohol containing at least two hydroxyl groups, a 2-hydroxy carboxylic acid and a base. The polyesters produced by such a process show a reduced amount of haze and yellowing in comparison to a known titanium isopropoxide catalyst U.S. Pat. No. 5,866,710 teaches that the resulting polyesters are useful in films and bottles; the reference does not teach or suggest using the resulting polyesters in fiber or yarn.

When polyester articles are formed from molten polyester, when processing polyesters into textile fibres or bottles for example, the polymer is melted and may be held in the molten state for a period of time before being shaped by e.g. spinning or injection moulding. Two key rheology measurements: shear viscosity or complex viscosity as a function of shear rate or frequency and extensional viscosity as a function of shear stress are used to characterize polyesters. Zero-shear viscosity is typically taken as an indication of polymer molecular weight while the transient extensional viscosity is an indicator of the polymer's extensional response to stretching.

We have now found a catalyst composition for producing polyesters in particular which exhibit unexpectedly improved melt rheological properties compared with polyester of the same intrinsic viscosity made using known catalyst systems, and which are therefore particularly suitable for making polyesters for such applications.

SUMMARY OF THE INVENTION

It is an object of the present invention to provide an improved process for preparing polyesters and an improved organometallic composition for use as a catalyst in such processes. It is also an object of the present invention to provide an improved polyester for melt processing applications and also formed articles made from the improved polyester.

According to the invention we provide a catalyst composition suitable for use as a catalyst for the preparation of an ester comprising:

(a) an organometallic compound which is the reaction product of an orthoester or condensed orthoester of titanium, zirconium or aluminium, an alcohol containing at least two hydroxyl groups, a 2-hydroxy carboxylic acid and a base, and (b) at least one compound of germanium, antimony or tin.

According to a second aspect of the invention, we provide a process for the preparation of a polyester which comprises carrying out a polyesterification reaction in the presence of a catalyst, which catalyst comprises (a) an organometallic compound which is the reaction product of an orthoester or condensed orthoester of titanium, zirconium or aluminium, an alcohol containing at least two hydroxyl groups, a 2-hydroxy carboxylic acid and a base, and (b) at least one compound of germanium, antimony or tin.

According to a third aspect of the invention, we provide a polyester article made by a process which comprises carrying out a polyesterification reaction in the presence of a catalyst, which catalyst comprises:

(a) an organometallic compound which is the reaction product of an orthoester or condensed orthoester of titanium, zirconium or aluminium, an alcohol containing at least two hydroxyl groups, a 2-hydroxy carboxylic acid and a base, and (b) at least one compound of germanium, antimony or tin to form a polyester material having an intrinsic viscosity of at least 0.5 dl/g, as measured by capillary viscometry using the method of ASTM D-4603, and subsequently forming the polyester article from the polyester material in the molten phase.

According to a fourth aspect of the invention, we provide a polyester article containing residues of a catalyst system which comprises (a) the reaction product of an orthoester or a condensed orthoester of titanium, zirconium or aluminium, an alcohol containing at least two hydroxyl groups, a 2-hydroxy carboxylic acid and a base and (b) at least one compound of germanium, antimony or tin.

The present invention also provides an unexpected result, that is a titanium based catalyst system having improved extensional viscosity compared with prior art tetraisopropyl titanate. This result is particularly beneficial in making polyester for fiber spinning applications.

DETAILED DESCRIPTION OF THE INVENTION

Figure 1:
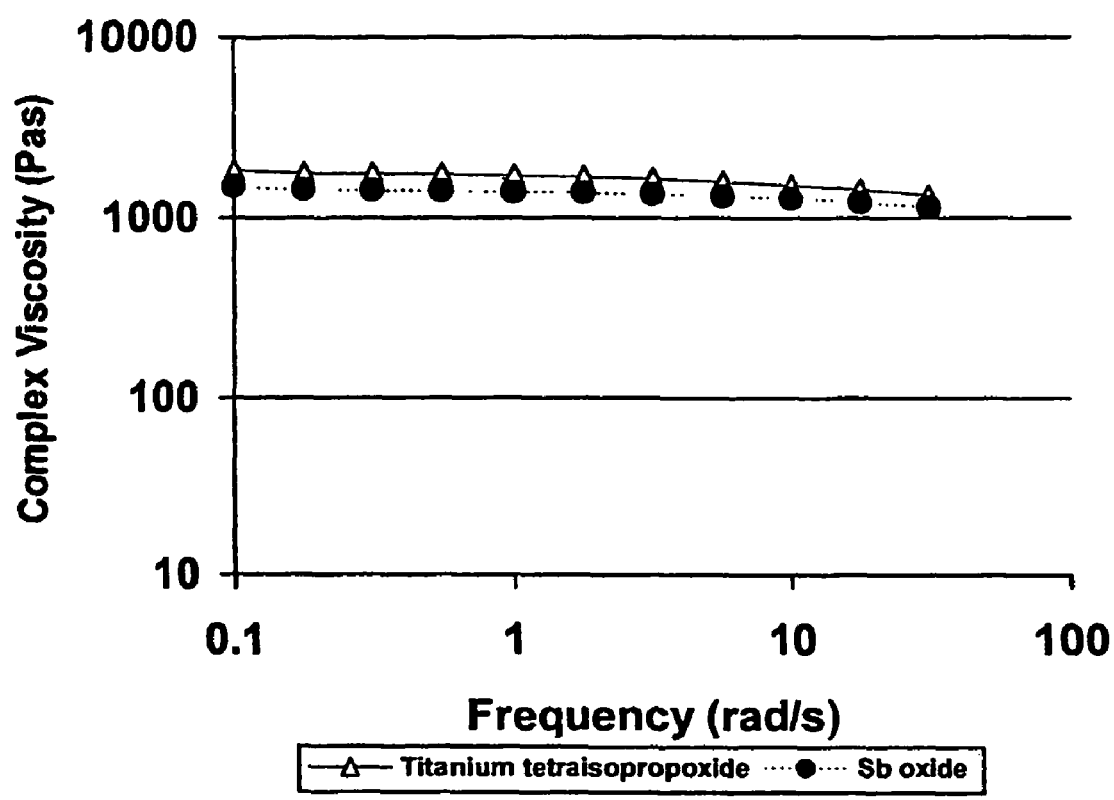
FIGS. 1 and 2 show rheological properties for polyester made from a prior art antimony catalyst and a titanium catalyst

The organometallic compound suitable for use in an esterification process as component (a) of the aforementioned catalyst composition comprises the reaction product of an orthoester or condensed orthoester of at least one metal selected from titanium, zirconium or aluminium. Normally an orthoester or condensed orthoester of one of the selected metals is used but it is within the scope of the invention to use an orthoester or condensed orthoester of more than one of the selected metals. For clarity we refer hereinafter to a titanium, zirconium or aluminium orthoester or condensed orthoester, and all such references should be taken to include orthoesters or condensed orthoesters of more than one metal, e.g. to a mixture of titanium and zirconium orthoesters.

Preferably, the orthoester has the formula M(OR)$_4$ or Al(OR)$_3$ where M is titanium or zirconium and R is an alkyl group. More preferably R contains 1 to 6 carbon atoms and particularly suitable orthoesters include tetraisopropoxy titanium, tetra-n-butoxy titanium, tetra-n-propoxy zirconium, tetra-n-butoxy zirconium and tri-iso-butoxy aluminium.

The condensed orthoesters suitable for preparing the organometallic compounds used in this invention are typically prepared by careful hydrolysis of titanium, zirconium or aluminium orthoesters. Titanium or zirconium condensed orthoesters are frequently represented by the formula

$R_1O[M(OR_1)_2O]nR_1$ in which R$^1$ represents an alkyl group and M represents titanium or zirconium. Preferably, n is less than 20 and more preferably is less than 10. Preferably, R$^1$ contains 1 to 12 carbon atoms, more preferably, R$^1$ contains 1 to 6 carbon atoms and useful condensed orthoesters include the compounds known as polybutyl titan ate, polyisopropyl titanate and polybutyl zirconate.

Preferably the alcohol containing at least two hydroxyl groups is a dihydric alcohol and can be a 1,2-diol such as 1,2-ethanediol, 1,2-propanediol, a 1,3-diol such as 1,3-propanediol or a dihydric alcohol containing a longer chain such as diethylene glycol or a polyethylene glycol. Preferred dihydric alcohols are 1,2-ethanediol and diethylene glycol. The organometallic compound can also be prepared from a polyhydric alcohol such as glycerol, trimethylolpropane or pentaerythritol.

Preferably the organometallic compound is prepared by reacting a dihydric alcohol with an orthoester or condensed orthoester in a ratio of from 2 to 12 moles of dihydric alcohol to each mole of the titanium or zirconium. More preferably the reaction product contains 4 to 8 moles dihydric alcohol per mole of titanium, zirconium or aluminium.

Preferred 2-hydroxy-carboxylic acids include lactic acid, citric acid, malic acid and tartaric acid. Some suitable acids are supplied as hydrates or as aqueous mixtures. Acids in this form as well as anhydrous acids are suitable for preparing the catalysts used in this invention. The preferred molar ratio of acid to titanium or zirconium in the reaction product is 1 to 4 moles per mole of titanium or zirconium. More preferably the organometallic compound contains 1.5 to 3.5 moles of 2-hydroxy acid per mole of titanium or zirconium.

A base is also used in preparing the reaction product which is used as the organometallic compound in the catalyst of the invention. The base may be an inorganic base or an organic base but is generally an inorganic base and suitable bases include sodium hydroxide, potassium hydroxide, ammonium hydroxide, sodium carbonate, magnesium hydroxide and ammonia. Preferred organic bases include quaternary ammonium compounds such as tetrabutyl ammonium hydroxide, tetraethylammonium hydroxide, choline hydroxide, (trimethyl (2-hydroxyethyl)ammonium hydroxide) or benzyltrimethyl ammonium hydroxide, or alkanolamines such as monoethanolamine, diethanolamine, triethanolamine and triisopropanolamine. Usually, the amount of base used is in the range 0.1 to 12 mole base per mole of metal (titanium, zirconium or aluminium). The preferred amount is in the range 0.1 to 4.0 mole base per mole of titanium, zirconium or aluminium.

Frequently, the amount of base used is sufficient to fully neutralise the 2-hydroxy carboxylic acid but it is not essential that the acid is fully neutralised.

In one preferred embodiment the organometallic compound comprises the reaction product of a titanium orthoester, citric acid, a dihydric alcohol and an inorganic base in which the mole ratio of titanium:acid:dihydric alcohol:base is in the range 1:1.5-3.5:4-10:2-12.

Typically, the organometallic compound is neutral. It is frequently convenient to add water together with the base when preparing the catalysts. Frequently, products which contain water have a pH in the range 6 to 8.

The organometallic compound can be prepared by mixing the components (orthoester or condensed orthoester, dihydric alcohol, 2-hydroxy acid and base) with removal of any by-product, (e.g. isopropyl alcohol when the orthoester is tetraisopropoxytitanium), at any appropriate stage. In one preferred method the orthoester or condensed orthoester and dihydric alcohol are mixed and subsequently, 2-hydroxy acid and then base are added or a pre-neutralised 2-hydroxy acid solution, is added. In an alternative preferred method the orthoester or condensed orthoester is reacted with the 2-hydroxy acid and by-product alcohol is removed. Base is then added to this reaction product followed by a dihydric alcohol to produce the reaction product which is used in the catalyst of the invention. If desired, further by-product alcohol can then be removed by distillation. U.S. Pat. No. 5,866,710 is incorporated herein by reference.

Component (a) alone may be used as the catalyst to make polyester for fibre applications including textile fiber and industrial fiber. The term "industrial fiber" as used herein includes fibre useful in the manufacture of tire cord, broad wovens, seat belts, conveyor belts, V belts, air bags, cut resistant articles, and ropes. Industrial fiber may be made by known methods such as those disclosed in U.S. Pat. Nos. 5,085,818; 5,132,067; 5,397,527; 5,630,976; 5,830,811; and 6,071,835; these patents are incorporated herein by reference.

Component (b) of the catalyst composition of the invention is a compound of germanium, antimony or tin and, in general, any compound can be used including mixtures of compounds of more than one of these metals. The preferred compound of germanium is germanium dioxide. Preferably, the antimony compound is antimony trioxide or a salt of antimony, for example antimony triacetate. A number of tin compounds are suitable, including salts, such as tin acetate and organotin compounds, such as dialkyl tin oxides, for example, dibutyl tin oxide, dialkyl tin dialkanoates, for example, dibutyl tin dilaurate and alkylstannoic acids, for example butylstannoic acid (C$_4$H$_9$SnOOH).

A wide range of proportions of components (a) and (b) can be present in the catalyst composition of the invention. Generally, the weight ratio of component (a) to component (b) is in the range 1:0-1000, calculated as weight of Ti, Zr or Al to weight of Ge, Sb or Sn. The two components, (a) and (b) may be premixed to form the catalyst composition of this invention before the composition is mixed with the reactants for an esterification reaction. Alternatively, components (a) and (b) can be separately added to the reactants in order to carry out an esterification reaction according to this invention.

The esterification reaction of the process of the invention can be any reaction by which an ester is produced. The reaction may be (i) a direct esterification in which a carboxylic acid or its anhydride and an alcohol react to form an ester or (ii) a transesterification (alcoholysis) in which a first alcohol reacts with a first ester to produce an ester of the first alcohol and a second alcohol produced by cleavage of the first ester or (iii) a transesterification reaction in which two esters are reacted to form two different esters by exchange of alkoxy radicals. Direct esterification or transesterification can be used in the production of polymeric esters and a preferred process of the invention comprises a polyesterification process. Many carboxylic acids and anhydrides can be used in direct esterification including saturated and unsaturated monocarboxylic acids and anhydrides of such acids such as stearic acid, isostearic acid, capric acid, caproic acid, palmitic acid, oleic acid, palmitoleic acid, triacontanoic acid, benzoic acid, methyl benzoic acid, salicylic acid and rosin acids such as abietic acid, dicarboxylic acids such as phthalic acid, isophthalic acid, terephthalic acid, sebacic acid, adipic acid, azelaic acid, succinic acid, fumaric acid, maleic acid, naphthalene dicarboxylic acid and pamoic acid and anhydrides of these acids and polycarboxylic acids such as trimellitic acid, citric acid, trimesic acid, pyromellitic acid and anhydrides of these acids. Alcohols frequently used for direct esterification include aliphatic straight chain and branched monohydric alcohols such as butyl, pentyl, hexyl, octyl and stearyl alcohols, dihydric alcohols such as 1,2-ethanediol, 1,3-propanediol, 1,4-butanediol and 1,6 cyclohexane dimethanol and polyhydric alcohols such as glycerol and pentaerythritol.

The esters employed in an alcoholysis reaction are generally the lower homologues such as methyl, ethyl and propyl esters since, during the esterification reaction, it is usual to eliminate the displaced alcohol by distillation. These lower homologue esters of the acids suitable for direct esterification are suitable for use in the transesterification process according to the invention. Frequently (meth)acrylate esters of longer chain alcohols are produced by alcoholysis of esters such as methyl acrylate, methyl methacrylate, ethyl acrylate and ethyl methacrylate. Typical alcohols used in alcoholysis reactions include butyl, hexyl, n-octyl and 2-ethyl hexyl alcohols and substituted alcohols such as dimethylaminoethanol.

When the esterification reaction is a transesterification between two esters, generally the esters will be selected so as to produce a volatile product ester which can be removed by distillation.

In direct esterification the acid or anhydride and an excess of alcohol are typically heated, if necessary in a solvent, in the presence of the catalyst composition. Water is a by-product of the reaction and this is removed, as an azeotrope with a boiling mixture of solvent and/or alcohol. Generally, the solvent and/or alcohol mixture which is condensed is at least partially immiscible with water which is therefore separated before solvent and/or alcohol are returned to the reaction vessel. When reaction is complete the excess alcohol and, when used, solvent are evaporated. In view of the fact that the catalyst compositions of the invention do not normally form insoluble species, it is not generally necessary to remove them from the reaction mixture, as is frequently necessary with conventional catalysts. A typical direct esterification reaction is the preparation of bis(2-ethylhexyl) phthalate which is prepared by mixing phthalic anhydride and 2-ethyl hexanol. An initial reaction to form a monoester is fast, but the subsequent conversion of the monoester to diester is carried out by refluxing in the presence of the catalyst composition at a temperature of 180-200° C. until all the water has been removed. Subsequently the excess alcohol is removed.

In an alcoholysis reaction, the ester, first alcohol and catalyst composition are mixed and, generally, the product alcohol (second alcohol) is removed by distillation, often as an azeotrope with the ester. Frequently it is necessary to fractionate the vapour mixture produced from the alcoholysis in order to ensure that the second alcohol is separated effectively without significant loss of product ester or first alcohol. The conditions under which alcoholysis reactions are carried out depend principally upon the components of the reaction and generally components are heated to the boiling point of the mixture used.

A particularly preferred embodiment of the esterification process of the invention is a polyesterification reaction in the presence of the catalyst composition of the invention. Polyesters can be produced by processes involving direct esterification or transesterification. In a polyesterification reaction polybasic acids or esters of polybasic acids are usually reacted with polyhydric alcohols. Preferred reactants are dicarboxylic acids such as phthalic acid, isophthalic acid, terephthalic acid, sebacic acid, adipic acid, azelaic acid, succinic acid, fumaric acid, maleic acid, naphthalene dicarboxylic acid and pamoic acid and esters and anhydrides of these acids and polycarboxylic acids such as trimellitic acid, citric acid, trimesic acid, pyromellitic acid and esters and anhydrides of these acids. Preferred alcohols include aliphatic straight chain and branched polyhydric alcohols such as 1,2-ethanediol (ethylene glycol), 1,4-butanediol (butylene glycol), 1,3-propanediol, 1,6-hexanediol, cyclohexane dimethanol, trimethylpropane, glycerol and pentaerythritol.

Preferred polyesterification reactions according to the invention include the reaction of terephthalic acid or dimethyl terephthalate with 1,2-ethanediol (ethylene glycol) to produce polyethylene terephthalate or with 1,4-butanediol (butylene glycol) to produce polybutylene terephthalate or reaction of naphthalene dicarboxylic acid with 1,2-ethanediol to produce polyethylene naphthalenate. Other glycols such as 1,3-propanediol, 1,6- hexanediol, trimethylpropane and pentaerythritol are also suitable for preparing polyesters.

The esterification reaction of the invention can be carried out using any appropriate, known technique for an esterification reaction.

A typical process for the preparation of polyethylene terephthalate comprises two stages. In the first stage terephthalic acid or dimethyl terephthalate is reacted with 1,2-ethanediol to form a prepolymer and the by-product water or methanol is removed. The prepolymer is subsequently heated in a second stage to remove 1,2-ethanediol and form a long chain polymer. Either or both these stages may comprise an esterification process according to this invention.

A typical batch production of polyethylene terephthalate is carried out by charging terephthalic acid and ethylene glycol to a reactor along with catalyst composition, if desired, and heating the contents to 260-270° C. under a pressure of about 0.3 MPa. Reaction commences as the acid dissolves at about 230° C. and water is removed. The product is transferred to a second autoclave reactor and catalyst composition is added, if needed. The reactor is heated to 285-310° C. under an eventual vacuum of 100 Pa to remove ethylene glycol by-product. The molten product ester is discharged from the reactor, cooled and chipped. The chipped polyester may be then subjected to solid state polymerisation, if appropriate.

A preferred means of adding the catalyst compositions of this invention to a polyesterification reaction is in the form of a slurry in the glycol being used (e.g. ethylene glycol in the preparation of polyethylene terephthalate). Components (a) and (b) can be added to the reaction mixture as separate slurries or mixed to prepare a slurry containing both components, which slurry is then added to the reactants. This method of addition is applicable to addition of the catalyst composition to the polyesterification reaction at the first stage or at the second stage.

The amount of catalyst used in the esterification process of the invention generally depends upon the total metal content (expressed as amount of Ti, Zr or Al plus amount of Ge, Sb or Sn) of the catalyst composition. Usually the amount is from 0.2 to 1200 parts per million (ppm) of metal based on weight of product ester for direct or transesterification reactions. Preferably, the amount is from 5 to 500 ppm of total metal based on weight of product ester: In polyesterification reactions the amount used is generally expressed as a proportion of the weight of product polyester and is usually from 5 to 500 ppm expressed as total metal (Ti, Zr or Al plus Ge, Sb or Sn) based on product polyester.

Generally, the amount of Ti, Zr or Al used in a direct esterification or transesterification will be in the range 0.1 to 50 ppm Ti, Zr or Al and more preferably in the range 0.1 to 30 ppm Ti, Zr or Al, based on product ester; and the amount of Ge, Sb or Sn used in a direct esterification or transesterification will be in the range 5 to 700 ppm Ge, Sb or Sn, preferably in the range 5 to 400 ppm Ge, Sb or Sn, based on product ester. For polyesterification, the preferred amount of Ti, Zr or Al is in the range 0.2 to 50 ppm Ti, Zr or Al based on product polyester. The preferred amount of Ge, Sb or Sn used in polyesterification is in the range 5 to 500 ppm Ge, Sb or Sn.

Additional compounds may be added to the polyesterification reaction if required. It is common to add a polymer stabiliser to the reaction mixture to stabilise the polymer against thermal degradation. A common stabiliser comprises a phosphorus compound, e.g. phosphoric acid. Colour adjustment compounds may also be added at this stage. For example, cobalt compounds, e.g. cobalt acetate, or organic dyes may be added to further counteract any tendency towards yellowness in the final polymer. For textile fibres, dyes, optical brighteners, pigments or dye pretreatments may be added to enhance dye retention or improve the susceptibility of the polymer to dyeing. It may also be required to control the co-products of the polyesterification process, in particular the diethylene glycol (DEG) content of the polymer, by addition of DEG suppressants such as bases or amines, as is known in the art. The DEG content of the polymer is believed to affect the thermal properties of the polymer. For certain applications, the DEG content should be low although for textile fibre it may be desirable to control the level of DEG to 0.8-1.5 weight %

The inventive catalyst combination comprising compound (a) and compound (b) may be used to make polyester for fiber applications including textile fiber and industrial fiber; moulding applications, including stretch blow moulding for e.g. rigid packaging such as bottles, jars and clamshell packs, extrusion for e.g. film, including oriented polyester film, and flexible packaging. The fiber may be made according to known methods cited above.

The invention is illustrated by the following examples.

EXAMPLE 1

Preparation of Compound A

Citric acid monohydrate (132.5 g, 0.63 moles) was dissolved in water (92.8 g). To the stirred solution was slowly added titanium isopropoxide (72.0 g, 0.25 moles). This mixture was heated to reflux for 1 hour to yield a hazy solution. This solution stripped under vacuum to remove free water and isopropanol. The product was cooled below 70° C. and 32% w/w aqueous sodium hydroxide (94.9 g, 0.76 moles) was added slowly to the stirred solution. The product was filtered, mixed with ethylene glycol (125.5 g, 2.0 moles) and heated under vacuum to remove free water/isopropanol. The product was a slightly hazy, very pale yellow liquid (Ti content 3.85% by weight), which is referred to hereinafter as Compound A Preparation of Compound B Ethylene glycol (217.85 g, 3.51 moles) was added from a dropping funnel to stirred titanium isopropoxide (284.8, 1.00 mole) in a 1 liter fishbowl flask fitted with stirrer, condenser, and thermometer. The rate of addition was controlled so that the heat of reaction caused the contents of the flask to warm to about 50° C. The reaction mixture was stirred for 15 minutes and aqueous 85% wt/wt ammonium lactate (251.98 g, 2.00 moles) was added to the reaction flask to yield a clear, pale yellow liquid (Ti content 6.54% by weight).

Preparation of Compound C

Following the method for Compound B, ethylene glycol (496.37 g, 8.0 moles) was added to titanium isopropoxide (284.8 g, 1.0 mole) followed by reaction with aqueous 60% wt/wt sodium lactate (374.48 g, 2.0 moles) to yield a pale yellow liquid (Ti content 4.13% by weight).

Preparation of Compound D

To titanium isopropoxide (142.50 g. 0.50 mole) in a one liter conical flask, fitted with sidearm condenser, supported on and stirred by means of a magnetic stirrer was slowly added ethylene glycol (248.25 g, 4.0 moles) from a dropping funnel. When addition was complete, the contents were stirred for 15 minutes before adding aqueous 60% wt/wt potassium lactate (213.03 g, 1.0 mole) by dropping funnel to yield a clear, very pale yellow product (Ti content 3.91% by weight).

Preparation of Compound E

Following the method for Compound D, diethylene glycol (127.58 g, 1.20 moles) was added to 135.95 g (0.3 mole) zirconium n-propoxide (72.3% wt/wt in n-propanol). To this stirred product was added aqueous 60% w/wt sodium lactate (112.04 g, 0.60 mole) to yield a pale yellow product (Zr content 7.28% by weight).

EXAMPLE 2

Preparation of Polymer 1

Compound A, prepared in Example 1 was used to prepare polyethylene terephthalate (PET) in the following way. Ethylene glycol (930 litres) and terephthalic acid (2250 kg) were charged to a stirred jacketed reactor. The catalyst and other additives were added and the reactor heated to 226-252° C. at a pressure of 2.9 bar to initiate the first stage direct esterification (DE) process. On completion of the DE reaction, (i.e. when water production stopped, indicated by a rise in column temperature), the contents of the reactor were allowed to reach atmospheric pressure before a vacuum was steadily applied. Sodium hydroxide (100 ppm) was added as a diethylene glycol suppressant and the mixture heated to 294±2° C. under vacuum to remove ethylene glycol and yield polyethylene terephthalate. The final polyester was discharged once a constant torque had been reached which indicated an intrinsic viscosity (IV) of around 0.62. The chipped polymer was then subjected to solid state polymerisation at about 230° C. in flowing nitrogen to increase the polymer molecular weight so as to have an intrinsic viscosity of about 1.0.

Polyesters of the invention were made using:
as catalyst compositions,
Compound A plus antimony trioxide (at 5 ppm Ti+250 ppm Sb) (i.e. a catalyst composition according to the invention)
Compound A alone (15 ppm),
and as comparisons:
antimony trioxide alone (350 ppm)
tetra(isopropoxy)titanium (15 ppm) (VERTEC™ TIPT™ available from ICI Synetix).

Properties of the Polymer Samples.

Intrinsic Viscosity (IV)

The polymer intrinsic viscosities were measured by glass capillary viscometry using 60/40 phenol/1,2,2-tetrachlorethane as solvent at 25° C.

Thermal Characteristics by DSC Analysis

Heat-cool differential scanning calorimetry (DSC) experiments on 're-quenched' samples were conducted as follows: 10 mg samples were dried at 80° C. in a vacuum oven. These dried samples were then held at 290° C. for 2 minutes in a Perkin-Elmer DSC instrument, before being quenched onto the cold block (−40° C.). The re-quenched samples were then subjected to a heat/hold 2 minutes/cool procedure, at heating & cooling rates of 20° C./minute on a Perkin-Elmer DSC 7a. The cooling data quoted below have been corrected by adding 2.8° C. to the computer-generated temperatures. The results are shown in Table 1.

TABLE 1

| Catalyst | Metal content (ppm) | IV (dl/g) | $Tg_o$ (°C.) | $Tn_o$ (°C.) | Tn (°C.) | Tp (°C.) | Tc (°C.) | $Tc_o$ (°C.) |
|---|---|---|---|---|---|---|---|---|
| Compound A + Sb2O3 | 5 + 250 | 0.95 | 80.0 | 129.2 | 149.5 | 257.1 | 189.4 | 201.5 |
| Sb oxide | 350 | 0.99 | 82.1 | 132.6 | 155.4 | 255.9 | 181.6 | 194.2 |
| Compound A | 15 | 1.03 | 83.5 | na | 145.9 | 258.5 | 188.3 | 198.4 |
| TIPT | 14 | 0.99 | 77 | 158 | 180 | 248 | — | — |

KEY:
$Tg_o$ = polymer glass transition temperature,
$Tn_o$ = onset of crystallisation (heating),
Tn = crystallisation peak (heating),
$Tc_o$ = onset of crystallisation (cooling),
Tc = crystallisation (cooling),
Tp = peak (melting) temperature.

Rotational Rheometry—Dynamic Oscillation

The materials were characterised using a Rheometrics rheometer.

The sample was placed in the rheometer between two 40 mm diameter parallel plates and heated to the measurement temperature 285° C. The sample was squeezed to remove any voids until a gap of between 1 and 2 mm was reached. Any residual material at the edges was removed.

From the measured torque response an in-phase storage modulus G', and an out of phase loss modulus G", have been calculated. A complex viscosity, ETA*, has subsequently been calculated from the moduli.

For measurements taken in the linear viscoelastic region (strain independent) it is possible to equate frequency with shear rate and complex viscosity with apparent shear viscosity. Therefore for simple unfilled systems it is acceptable to think of frequency (rads/s) as shear rate (/s) and complex viscosity (Pa.s) as shear viscosity (Pa.s).

Capillary Rheometry

The materials were characterised at 285° C. using a Rosand capillary rheometer. The polymer charge was melted in the heated rheometer barrel prior to extrusion. The melt was extruded at a range of flow rates through a die 1 mm in diameter and the pressure drop was measured at the die entry at each rate. Two parallel measurements using different die lengths were made to allow a die entry correction (Bagley) to be made. The apparent shear and elongational viscosity's (Cogswell) were calculated from the die geometry and pressure drops recorded. Units of viscosity are Pa.s. Shear rate is a function of the volumetric flow rate and die geometry and is measured in reciprocal seconds ($s^{-1}$).

Figure 2:
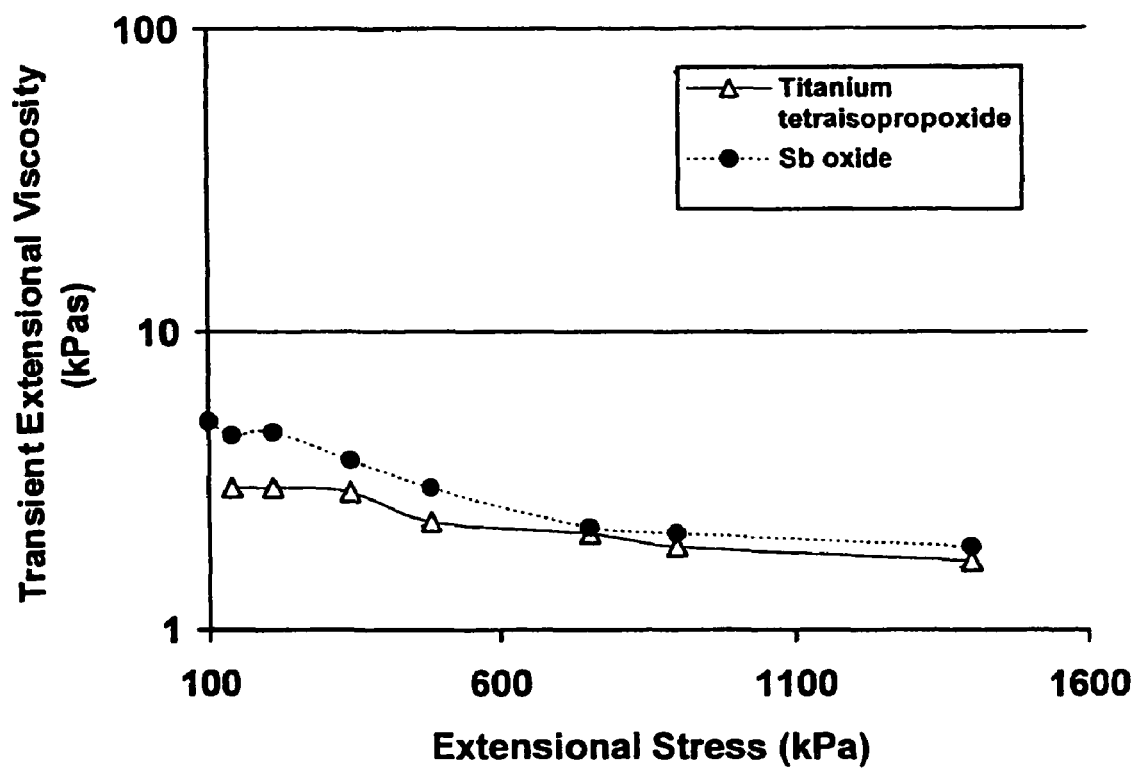
Figure 3:
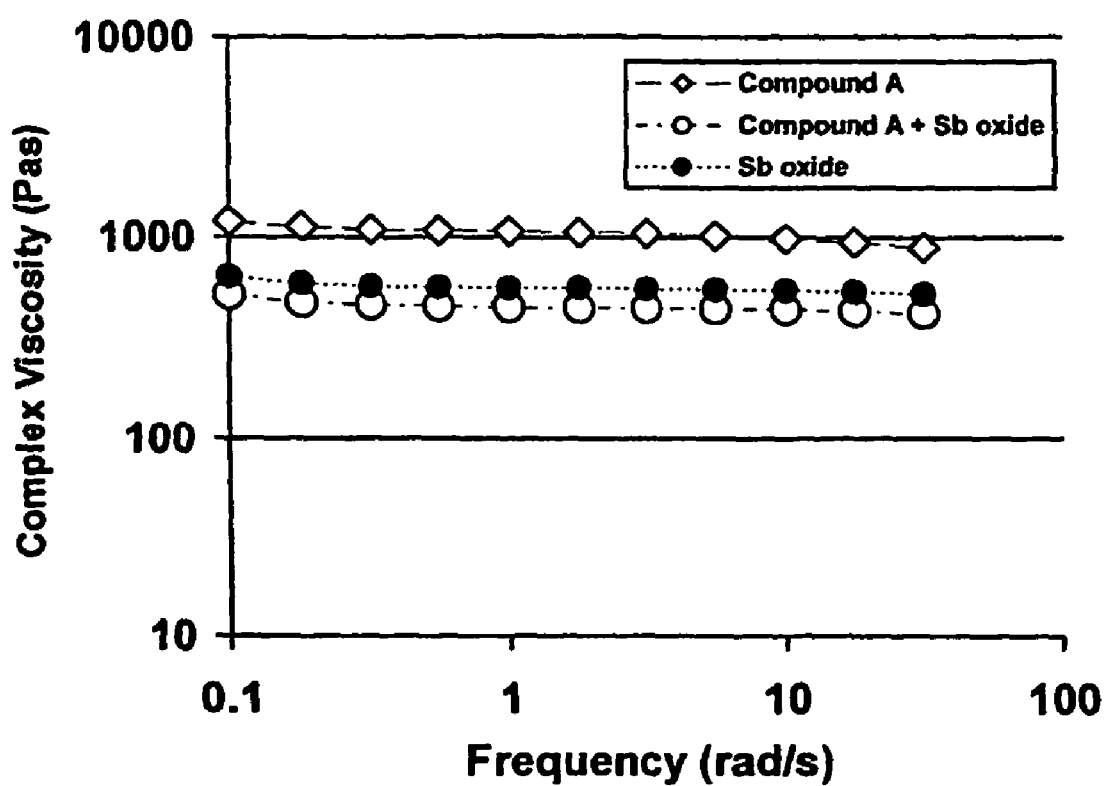
FIGS. 3 and 4 show rheological properties for polyester made from the catalysts of the invention and a prior art comparison.
Figure 4:
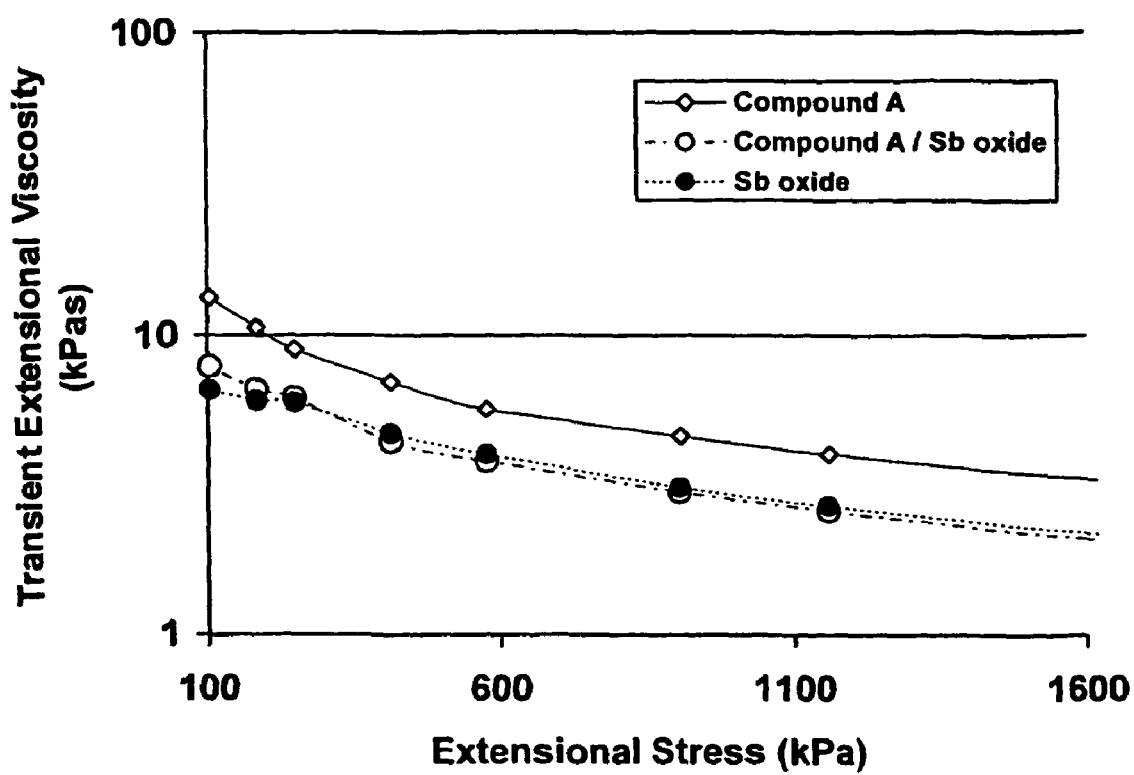

The results in FIG. 4 show that the polymer in which the inventive catalyst of Compound A is present has extensional viscosity significantly better than that of polymer made with Sb alone. This result is surprising, given that polyesters made using the prior art titanium catalyst (titanium tetraisopropoxide) had extensional viscosities significantly reduced from those of polymers made with Sb catalysts. Polymer molecular weight may be estimated from the zero shear viscosity measurement, which is typically inferred from the complex viscosity at low frequency of oscillation using rotational rheometry. Normally this means that the extensional viscosity correlates with the molecular weight of the polymer, e.g. a polymer with low zero-shear viscosity typically has a low extensional viscosity. FIG. 3 shows that polyester made from Sb alone has a higher zero shear viscosity than the inventive combination of Sb and Compound A Based on the prior art titanium data in FIGS. 1 and 2, one skilled in the art would have expected that the inventive catalyst combination would exhibit a lower extension viscosity. However, transient extensional viscosities (FIG. 4) are essentially identical for polyester made from the Sb control and the inventive catalyst combination. Thus, the present invention has eliminated the large deficiency in reduced extensional viscosity that occurred in polyesters made from prior art titanium catalysts.

We tried using polyester made from titanium tetraisopropoxide catalyst to make dimensionally stable polyester yarn according to U.S. Pat. No. 5,132,067. With the TIPT polyester, ft appeared possible to achieve higher strength at low dimensional stability or higher dimensional stability at low strength but not both together as was possible with polyester made from Sb catalyst The differences in Theological characterization discussed above are consistent with, and appear to explain the differences in undrawn response of the two polyesters. With a significantly lower extensional viscosity, the TIPT polyester has a relatively lower resistance to being stretched and hence in making industrial fiber from the polyester, more spinline stress, i.e. higher spinning speed, is required in order to produce the same orientation, e.g., birefringence and crystallinity, in the undrawn industrial fiber.

The behaviour of polyester under stretching flow (elongation) would normally be proportional to the molecular weight of the polyester. The catalyst system of the invention, despite the lower molecular weight, demonstrates equivalent or better resistance to stretch flow. This is consistent with the catalyst system of the invention giving higher spinline stress and ultimately fibre crystallinity.

Chemical Analysis of Polymers

The carboxyl end groups were determined by automatic potentiometric titration whereby the sample is dissolved in a solvent mixture of 70% o-cresol/30% chloroform and titrated on an autotitrator with standardized KOH in methanol The polymers were examined by $^1$H NMR spectroscopy to determine the amount of diethylene glycol (DEG) residues present in the polymer chain (expressed as weight percent of polymer), the proportion of hydroxyl (OH) end groups present (expressed as number of end groups per 100 polymer repeating units) and the proportion of vinyl end groups (VEG) present (expressed as number of end groups per 100 polymer repeating units).

EXAMPLE 3

Preparation of Fibre

Dried PET chip was fed under nitrogen into a single screw extruder fitted with gear pump, spin block, spin pot and spinnerette. The temperature profile of this system was chosen to give the desired polymer melt viscosity. A continuous multifilament product was produced by passing the molten filaments exiting the spinnerette through a heated sleeve and quench stack and then drawn between heated godet rolls to produce a product with the desired draw ratio and total denier.

The multi-filament product was collected on cardboard sleeves using an automatic doff winder and tested off-line.

Fibre Properties

The properties of the fibres made with the three catalyst systems are shown in Table 2. The fibre made from the TIPT-catalysed polymer showed poor take-up properties and a high rate of fibre breakage compared with fibres made from the other catalysts. For this reason, detailed measurements were not made.

The IV loss was measured as the difference between the IV of the chip before extrusion and the IV of freefall fibre. The freefall fibre is fibre allowed to fall freely from the spinneret Carboxyl (COOH) values were also determined on the freefall fibre. The fray count is measured by a detector above the take-up winder on fibre spinning. This detector consists of a light-beam which measures loops/broken filament within the fibre.

TABLE 2

| Property | Compound A + $Sb_2O_3$ | $Sb_2O_3$ | Compound A |
|---|---|---|---|
| Freefall IV (g/dL) | 0.85 | 0.83 | 0.88 |
| Extrusion IV Loss | 0.10 | 0.16 | 0.15 |
| COOH | 22.5 | 30.6 | 20.9 |
| Frays/lb | 9.8 | 49.3 | |

The density of the undrawn and drawn yarn is a convenient measure of percent crystallinity. Densities of undrawn and drawn yarns were determined in n-heptane/carbon tetrachloride density gradient column at 23° C. The gradient column was prepared and calibrated according to ASTM D1505-68 with density ranging from 1.30-1.43 g/cm³. Percentage crystallinity was then calculated from:

$$\text{Weight \% } XTAL = \frac{(Ys - Ya)(Yc/Ys)}{(Yc - Ya)} \times 100$$

Ys—measured density of sample in gm/cm3
Ya—theoretical density of 100% amorphous phase (1.335 gm/cm³)
Yc—theoretical density of 100% crystalline phase (1.455 gm/cm³)

Figure 5:
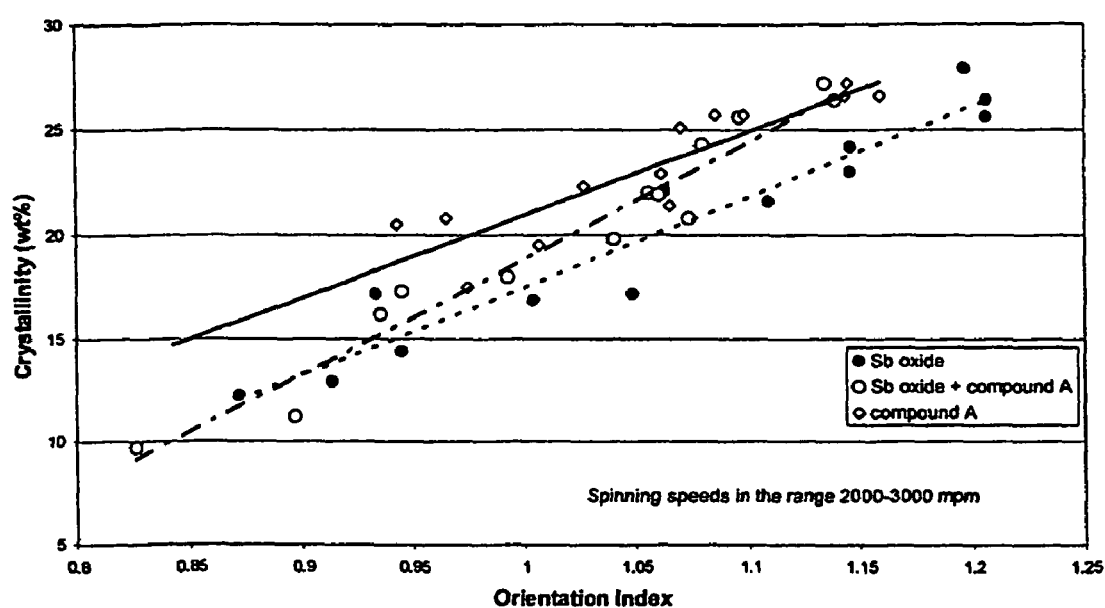
FIG. 5 shows a measure of crystallinity and orientation index for polyester fibres of the invention and an antimony comparison.

The crystallinity and orientation index was determined at various spinning speeds and is shown graphically in FIG. 5. Although quiescent crystallisation, e.g. by DSC techniques does not always accurately reflect spin-line crystallisation kinetics, however as shown in FIG. 5, for a given fibre orientation index, the percent crystallinity is, in nearly all cases, higher for polymers containing the mixed catalyst system of the invention compared to the Sb only polymers. This is in keeping with the belief that the higher the peak crystallisation temperature on cooling from melt (Tc) the greater the opportunity for development of crystallisation in the spinline—all other conditions being constant.

The results show that using the catalyst system and polyesterification process of the invention it is possible to produce polymer having properties which are comparable with or better than polymer made using a standard antimony catalyst, whilst the level of antimony is considerably reduced. The reduced metal burden of the polyesters of the invention lead to a cleaner polymer which provides environmental benefits and also processing benefits in the end use. For example, a high level of antimony catalyst can lead to levels of insoluble elemental antimony in the finished polymer which may cause breakage of or defects in a fibre made from such polymer. Reducing the elemental antimony can therefore produce a better fibre and enable the fibre spinning process to be operated at higher speeds and with superior "runnability". Furthermore, colour management of the polymer, for example by incorporation of dyes or inorganic toners, may be easier because the greying effects of antimony are reduced whilst the polymer is less yellow than a similar polymer containing more titanium.

The benefits of reduced levels of antimony in the final polymer are useful in most melt processing applications. For example in film manufacture the level of imperfections in the film would be expected to be lower using polyester made according to the method of the invention. The polymer also has a better appearance; the lower levels of antimony giving a polymer having a better "sparkle". In bottle manufacture, the improved melt rheological processing properties may also provide benefits in process stability and product quality. The polyester made by the process of the invention and using the catalyst of the invention is therefore useful in producing films and rigid pacaking articles such as bottles, trays and clamshell containers.

The invention claimed is:

1. A catalyst composition suitable for use as a catalyst for the preparation of an ester comprising
   (a) a preformed metal-organic compound which is the product resulting from the reaction of
      (i) an orthoester or condensed orthoester of titanium, zirconium, or aluminum,
      (ii) an alcohol containing at least two hydroxyl groups,
      (iii) a 2-hydroxy carboxylic acid, and
      (iv) an organic base selected from the group consisting of quaternary ammonium hydroxide compounds; and
   (b) at least one compound of germanium, antimony or tin.

2. A catalyst composition as claimed in claim 1, wherein the metal-organic compound is a reaction product of a titanium orthoester.

3. A catalyst composition as claimed in claim 1, wherein said alcohol is a dihydroxy alcohol.

4. A catalyst composition according to claim 3 wherein the metal-organic compound comprises titanium or zirconium and contains from 2 to 12 moles of dihydroxy alcohol per mole of titanium or zirconium.

5. A catalyst composition as claimed in claim 1, wherein said carboxylic acid is lactic acid, citric acid, malic acid or tartaric acid.

6. A catalyst composition according to claim 1 wherein the metal-organic compound comprises titanium or zirconium and contains from 1 to 4 moles of 2-hydroxy carboxylic acid per mole of titanium or zirconium.

7. A catalyst composition as claimed in claim 1, wherein said base is tetrabutyl ammonium hydroxide, tetraethylammonium hydroxide, trimethyl(2-hydroxyethyl)ammonium hydroxide, or benzyltrimethyl ammonium hydroxide.

8. A catalyst composition as claimed in claim 1, wherein the metal-organic compound comprises the reaction product of a titanium orthoester, citric acid, a dihydric alcohol and an inorganic base in which the mole ratio of titanium:acid:dihydric alcohol: base is in the range 1:1.5-3.5:4-10:2-12.

9. A catalyst composition according to claim 1, wherein the compound of germanium is germanium dioxide or a salt of germanium.

10. A catalyst composition according to claim 1, wherein the compound of antimony is antimony trioxide or a salt of antimony.

11. A catalyst composition according to claim 1, wherein the compound of tin is a tin salt, a dialkyl tin oxide, a dialkyl tin dialkanoate or an alkylstannoic acid.

12. A catalyst composition according to claim 1, wherein the weight ratio of component (a) to component (b) is up to 1:1000, calculated as weight of Ti, Zr or Al in component (a) to weight of Ge, Sb or Sn in component (b).

13. A process for the production of a polyester comprising the reaction of a compound selected from the group consisting of terephthalic acid, dimethyl terephthalate, isophthalic acid, dimethyl isophthalate, dimethyl 2,6 naphthalate or naphthalene dicarboxylic acid with an alcohol selected from the group consisting of 1,2-ethanediol, 1,4-butanediol, 1,3 propane diol, 1,6-hexanediol, trimethylol-propane and pentaerythritol in the presence of a catalyst composition comprising:
  (a) a preformed metal-organic compound which is the product resulting from the reaction of
    (i) an orthoester or condensed orthoester of titanium, zirconium, or aluminum,
    (ii) an alcohol containing at least two hydroxyl groups,
    (iii) a 2-hydroxy carboxylic acid, and
    (iv) an organic base selected from the group consisting of quaternary ammonium hydroxide compounds; and
  (b) at least one compound of germanium, antimony or tin.

14. A process as claimed in claim 13 in which the esterification reaction is a direct esterification or a transesterification and the catalyst is present in an amount in the range 0.2 to 1200 parts per million calculated as parts by weight of metal with respect to weight of product ester.

15. A process as claimed in claim 13, wherein the esterification is a polyesterification and the catalyst is present in an amount in the range 5 to 500 parts per million calculated as parts by weight of metal with respect to weight of product polyester.

16. A process for the manufacture of a polyester article comprising:
  (i) reacting together a compound selected from the group consisting of terephthalic acid, dimethyl terephthalate, isophthalic acid, dimethyl isophthalate, dimethyl 2,6 naphthalate and naphthalene dicarboxylic acid with an alcohol selected from the group consisting of 1,2-ethanediol, 1,4-butanediol, 2,3-propanediol, 1,6-hexanediol, trimethylol-propane and pentaerythritol in the presence of a catalyst composition comprising:
    (a) a preformed metal-organic compound which is the product resulting from the reaction of an orthoester or condensed orthoester of titanium, zirconium; or aluminum, an alcohol containing at least two hydroxyl groups, a 2-hydroxy carboxylic acid, and an organic base selected from the group consisting of quaternary ammonium hydroxide compounds, and
    (b) at least one compound of germanium, antimony and tin,
  (ii) optionally subjecting the resulting polymer to a solid phase polymerisation reaction, to form a polyester material having an intrinsic viscosity of at least 0.5 dl/g, as measured by the method of ASTM D-4603, and
  (iii) forming said polyester article from said polymer in the melt phase and
  (iv) cooling.

17. The process of claim 16 wherein said polyester article is a polyester fiber, and further comprising the additional step of drawing said polyester fiber.

18. A polyester article containing residues of a catalyst composition comprising:
  (a) a preformed metal-organic compound which is the product resulting from the reaction of an orthoester or condensed orthoester of titanium, zirconium, or aluminum, an alcohol containing at least two hydroxyl groups, a 2-hydroxy carboxylic acid, and an organic base selected from the group consisting of quaternary ammonium hydroxide compounds, and
  (b) at least one compound of germanium, antimony or tin.

19. A polyester article as claimed in claim 18, which is a fibre, film or container.

20. A polyester article as claimed in claim 19 comprising an industrial fibre.

21. A polyester article as claimed in claim 19 comprising a fibre suitable for use as a textile fibre.

22. A tire cord comprising said industrial fiber of claim 20.

23. A seat belt comprising said industrial fiber of claim 20.

24. A rubber reinforced article comprising said tire cord of claim 22.

25. A tire comprising said rubber reinforced article of claim 24.

26. A safety restraint system comprising said seat belt of claim 23.

27. A polyester article as claimed in claim 19 comprising a film.

28. A polyester article as claimed in claim 19 comprising a rigid packaging article.

29. A process for the manufacture of a polyester fiber comprising:
  (i) reacting together a compound selected from the group consisting of terephthalic acid, dimethyl terephthalate, isophthalic acid, dimethyl isophthalate, dimethyl 2,6 naphthalate and naphthalene dicarboxylic acid with an alcohol selected from the group consisting of 1,2-ethanediol, 1,4-butanediol 2,3-propanediol, 1,6-hexanediol, trimethylol-propane and pentaerythritol in the presence of a catalyst composition comprising: a preformed metal-organic compound which is the product resulting from the reaction of an orthoester or condensed orthoester of titanium, zirconium, or aluminum, an alcohol containing at least two hydroxyl groups, a 2-hydroxy carboxylic acid, and an organic base selected from the group consisting of quaternary ammonium hydroxide compounds, and
  (ii) optionally subjecting the resulting polymer to a solid phase polymerisation reaction, to form a polyester material having an intrinsic viscosity of at least 0.5 dl/g, as measured by the method of ASTM D-4603, and
  (iii) forming said polyester fiber from said polymer in the melt phase and
  (iv) cooling.

30. The process of claim 29 further comprising the additional step of drawing said polyester fibre.

31. A polyester article according to claim 28, wherein said rigid packaging article comprises a bottle.

32. A polyester article according to claim 28, wherein said rigid packaging article comprises a jar.

33. A polyester article according to claim 28, wherein said rigid packaging article comprises a clamshell package.

34. A process according to claim 29, wherein the catalyst composition additionally contains at least one compound of germanium, antimony and tin.

35. A polyester material containing residues of a catalyst composition comprising a metal-organic compound consisting essentially of the product resulting from the reaction of:
  (a) an orthoester or condensed orthoester of titanium, zirconium, or aluminium;
  (b) an alcohol containing at least two hydroxyl groups;

(c) a 2-hydroxy carboxylic acid; and
(d) an organic base selected from the group consisting of tetraethyl ammonium hydroxide or benzyltrimethyl ammonium hydroxide.

36. A polyester material according to claim 35, wherein the metal-organic compound is a reaction product of a titanium orthoester.

37. A polyester material according to claim 35, wherein said carboxylic acid is selected from lactic acid, citric acid, malic acid and tartaric acid.

38. A polyester material according to claim 35, wherein the metal-organic compound contains from 1 to 4 moles of 2-hydroxy carboxylic acid per mole of titanium or zirconium.

39. A catalyst composition consisting essentially of a metal-organic compound which is the product resulting from the reaction of:
   (a) an orthoester or condensed orthoester of titanium, zirconium, or aluminium;
   (b) an alcohol containing at least two hydroxyl groups;
   (c) a 2-hydroxy carboxylic acid; and
   (d) an organic base selected from the group consisting of tetraethyl ammonium hydroxide or benzyltrimethyl ammonium hydroxide.

40. A catalyst composition according to claim 39, wherein the metal-organic compound is a reaction product of a titanium orthoester.

41. A catalyst composition according to claim 39, wherein said carboxylic acid is selected from lactic acid, citric acid, malic acid and tartaric acid.

42. A catalyst composition according to claim 39, wherein the metal-organic compound contains from 1 to 4 moles of 2-hydroxy carboxylic acid per mole of titanium or zirconium.

43. A catalyst composition according to claim 39, consisting essentially of a metal-organic compound which is the product resulting from the reaction of:
   (a) an orthoester or condensed orthoester of titanium or zirconium;
   (b) a dihydric alcohol;
   (c) a 2-hydroxy carboxylic acid selected from the group consisting of lactic acid, citric acid, malic acid and tartaric acid; and
   (d) an organic base selected from the group consisting of tetraethylammonium hydroxide, or benzyltrimethyl ammonium hydroxide.

44. The polyester material of claim 35, wherein the polyester material is in the form of a fiber.

45. The fiber of claim 44, wherein the fiber has improved extensional viscosity.

46. The polyester fiber of claim 44 wherein said fiber is an industrial fiber.

47. The polyester fiber of claim 44 wherein said fiber is a textile fiber.

48. A tire cord comprising said industrial fiber of claim 46.

49. A seat belt comprising said industrial fiber of claim 46.

50. A rubber reinforced article comprising said tire cord of claim 48.

51. A tire comprising said rubber reinforced article of claim 50.

52. A safety restraint system comprising said seat belt of claim 49.

53. The fiber of claim 45 wherein said fiber is industrial fiber.

54. The fiber of claim 45 wherein said fiber is a textile fiber.

55. A polyester fiber according to claim 44, wherein the catalyst composition additionally contains at least one compound of germanium, antimony and tin.

56. A catalyst composition consisting of a metal-organic compound which is the product resulting from the reaction of:
   (a) an orthoester or condensed orthoester of titanium, zirconium, or aluminium;
   (b) an alcohol containing at least two hydroxyl groups;
   (c) a 2-hydroxy carboxylic acid; and
   (d) an organic base selected from the group consisting of tetraethyl ammonium hydroxide or benzyltrimethyl ammonium hydroxide.

* * * * *